United States Patent
Mathew et al.

(10) Patent No.: US 7,257,643 B2
(45) Date of Patent: Aug. 14, 2007

(54) METHOD AND APPARATUS TO IMPROVE NETWORK ROUTING

(75) Inventors: Philip P. Mathew, Santa Clara, CA (US); Ranjeeta Singh, Sunnyvale, CA (US); Michael R. Lewin, San Francisco, CA (US); Harshawardhan Vipat, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 506 days.

(21) Appl. No.: 10/150,315

(22) Filed: May 16, 2002

(65) Prior Publication Data

US 2003/0217175 A1    Nov. 20, 2003

(51) Int. Cl.
| | |
|---|---|
| G06F 15/16 | (2006.01) |
| G06F 9/26 | (2006.01) |
| G06F 12/00 | (2006.01) |
| H04L 12/56 | (2006.01) |
| H04J 3/22 | (2006.01) |
| G06F 15/173 | (2006.01) |
| G06F 9/34 | (2006.01) |
| H04L 12/28 | (2006.01) |
| H04J 3/16 | (2006.01) |
| H04J 3/24 | (2006.01) |

(52) U.S. Cl. ............... 709/238; 709/236; 709/239; 709/245; 709/246; 711/202; 711/206; 711/212; 711/220; 370/395.3; 370/395.31; 370/395.32; 370/395.5; 370/409; 370/471

(58) Field of Classification Search ............ 709/239, 709/242–247, 236–238, 232, 249; 711/202, 711/206, 207, 212, 220; 370/395.3–395.32, 370/395.5, 409, 470, 471
See application file for complete search history.

(56) References Cited

U.S. PATENT DOCUMENTS

| | | | | |
|---|---|---|---|---|
| 5,974,453 A | * | 10/1999 | Andersen et al. ............ | 709/220 |
| 6,845,091 B2 | * | 1/2005 | Ogier et al. ................. | 370/338 |
| 6,865,184 B2 | * | 3/2005 | Thubert et al. ............. | 370/401 |
| 7,058,730 B2 | * | 6/2006 | Harbin ....................... | 709/249 |

(Continued)

FOREIGN PATENT DOCUMENTS

EP    1 035 687 A2    9/2000

(Continued)

OTHER PUBLICATIONS

R. Hinden, M. O'Dell, S. Deering, "An IPv6 Aggregatable Global Unicast Address Format", IETF Network Working Group, Request for Comments: 2374, Jul. 1998, pp. 1-9.*

(Continued)

*Primary Examiner*—Jason Cardone
*Assistant Examiner*—Melvin H. Pollack
(74) *Attorney, Agent, or Firm*—Kacvinsky LLC

(57) ABSTRACT

A method and apparatus to route information in a network is described. A technique is described to search for routine information that uses a first technique on at least a portion of a first value of a network address and a second technique on at least a portion of a second section of an address. In particular, the first value is associated with an aggregation identifier, and compared to a unique prefix. In this way, address identifiers may be generated, and this identifier is used to search for routing information.

16 Claims, 6 Drawing Sheets

U.S. PATENT DOCUMENTS

| | | | |
|---|---|---|---|
| 7,095,738 B1 * | 8/2006 | Desanti | 370/389 |
| 2001/0056417 A1 | 12/2001 | Cao et al. | |
| 2002/0062388 A1 * | 5/2002 | Ogier et al. | 709/238 |

FOREIGN PATENT DOCUMENTS

| | | |
|---|---|---|
| EP | 1035687 A2 | 9/2001 |
| WO | 0126303 A1 | 4/2001 |
| WO | WO 01/93196 A2 | 12/2001 |

OTHER PUBLICATIONS

Huang, Hui and Ma, Jian. "IPv6—future approval networking," Intl. Conf. on Communication Technology Proceedings, vol. 2, Aug. 21, 2000-Aug. 25, 2000, pp. 1734-1739.*

Boustead, Paul and Chicharo, Joe. "Label Switching Using the IPv6 Address Heirarchy," IEEE Global Telecommunications Conference, vol. 1, Nov. 27, 2000-Dec. 1, 2000, pp. 500-504.*

Lee, David, et al. "The Next Generation of the Internet: Aspects of the Internet Protocol Version 6," IEEE Network, vol. 12, Issue 1, Jan./Feb. 1998, pp. 28-33.*

Weiser, Mark. "Whatever Happened to the Next-Generation Internet?" Communications of the ACM, vol. 44, Issue 9, Sep. 2001, pp. 61-68.*

* cited by examiner

METHOD AND APPARATUS TO IMPROVE NETWORK ROUTING

BACKGROUND

Information may be sent through a network using a network address. For example, a router may receive information that is to be routed to another network device. The router may use a network address, such as a destination address, to search for the appropriate routing information. As the size of the network increases, however, a router may have less search time to route the information. Therefore, there may be a need to reduce search time for routing information that may result in the faster processing of packets.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

DETAILED DESCRIPTION

Embodiments of the invention may comprise a method and apparatus to improve the routing of information over a network. As information travels through a network from a source to a particular destination, a number of network devices may need to search for routing information. The search may use a network address. The latency associated with a search may be directly related to the size of the network address. Typically, the more bits used to represent a network address the more memory accesses needed to search for routing information. Consequently, a smaller network address may incur lower latencies during the search process.

The embodiments of the invention attempt to generate an address identifier that is smaller than the network address, and use the address identifier to search for routing information. The term "address identifier" as used herein may refer to a value represented by a number of bits derived from a network address. Since the address identifier is typically smaller than the network address, the latency associated with search times may be decreased. Accordingly, a user may realize better network services as information is communicated between points in a shorter period of time.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Numerous specific details may be set forth herein to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

Figure 1:
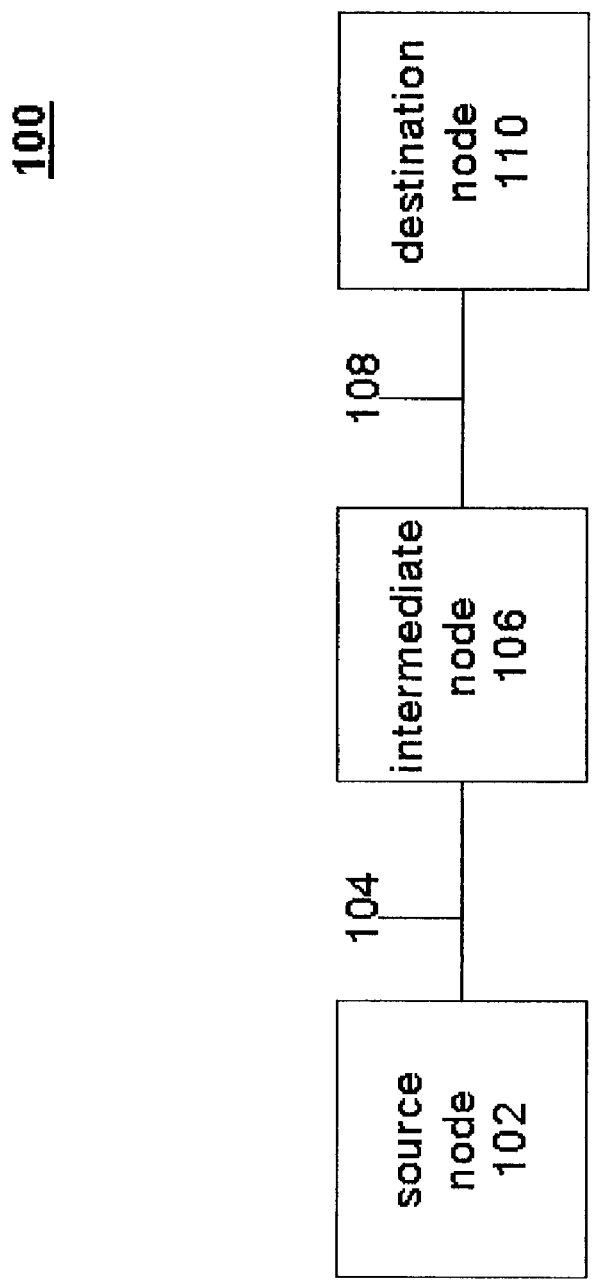
FIG. 1 is a system suitable for practicing one embodiment of the invention.

Referring now in detail to the drawings wherein like parts are designated by like reference numerals throughout, there is illustrated in FIG. 1 a system suitable for practicing one embodiment of the invention. FIG. 1 is a block diagram of a system 100 comprising a number of network nodes connected by one or more communications media. A network node ("node") in this context may include any device capable of communicating information, such as a computer, server, switch, router, bridge, gateway, personal digital assistant, mobile device and so forth. A communications medium may include any medium capable of carrying information signals, such as twisted-pair wire, co-axial cable, fiber optics, radio frequencies, electronic, acoustic or optical signals, and so forth.

More particularly, system 100 may comprise a source node 102, intermediate node 106 and destination node 110. Source node 102, intermediate node 106 and destination node 110, may be connected by communications media 104 and 108 as shown. Although FIG. 1 shows only one source node, one intermediate node and one destination node, it can be appreciated that any number of network nodes may be used in system 100 and still fall within the scope of the invention. Furthermore, the terms "connection" and "interconnection," and variations thereof, in this context may refer to physical connections and/or logical connections.

In one embodiment of the invention, system 100 may comprise a packet-switched network. Packet switching in this context may refer to communicating information over a network in the form of relatively short packets in accordance with one or more communications protocols. A packet in this context may refer to a set of information of a limited length, with the length typically represented in terms of bits or bytes. An example of a packet length might be 1000 bytes. A protocol may comprise a set of instructions by which the information signals are communicated over the communications medium. For example, the protocol might be a packet switching protocol such as the Transmission Control Protocol (TCP) as defined by the Internet Engineering Task Force (IETF) standard 7, Request For Comment (RFC) 793, adopted in September, 1981 ("TCP Specification"), and the Internet Protocol (IP) as defined by the IETF standard 5, RFC 791, adopted in September, 1981 ("IP Specification"), both available from "www.ietf.org" (collectively referred to as the "TCP/IP Specification").

In one embodiment of the invention, source node 102 may comprise a node that originates a set of information for delivery to destination node 110. Destination node 110 may comprise a node that is the intended recipient of the information. Intermediate node 106 may comprise a node that communicates the information between source node 102 and destination node 110. In some cases, there may be more than one source node, destination node, and/or intermediate node.

For example, in a multicast connection there may be multiple destination nodes. In another example, there are frequently multiple intermediate nodes between a source node and destination node. One example of each is shown for purposes of clarity, although the embodiments are not limited in this context. Information may comprise any data capable of being represented as a signal, such as an electrical signal, optical signal, acoustical signal and so forth. Examples of information in this context may include data from a voice conversation, videoconference, streaming video, electronic mail ("email") message, voice mail message, alphanumeric symbols, graphics, image, video, text and so forth.

In general operation, source node 102 may send information to destination node 110 through intermediate node 106 in accordance with the TCP/IP Specification. The source node breaks a set of information into a series of packets. Each packet may contain a portion of the information plus some control information. The control information may assist intermediate nodes in the network to route each packet to the destination node. Source node 102 may send the packets to intermediate node 106. Intermediate node 106 may receive the packets, store them briefly, and pass them to the next intermediate node or destination node 110. Destination node 110 may eventually receive the entire series of packets and may use them to reproduce the original information sent by source node 102.

Figure 2:
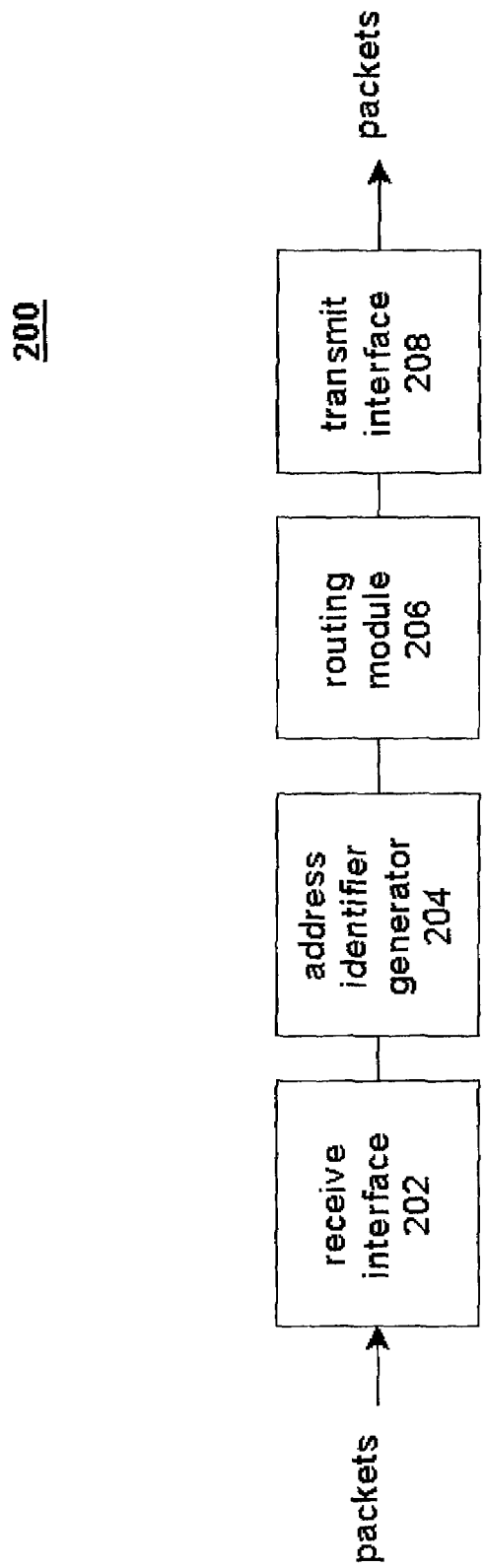
FIG. 2 is a block diagram of a routing system in accordance with one embodiment of the invention.

FIG. 2 illustrates a block diagram of a routing system in accordance with one embodiment of the invention. FIG. 2 may illustrate a routing system 200 that incorporates functionality that may be implemented as software executed by a processor, hardware circuits or structures, or a combination of both. The processor may be a general-purpose or dedicated processor, such as a processor from the family of processors made by Intel Corporation, Motorola Incorporated, Sun Microsystems Incorporated and others. The software may comprise programming logic, instructions or data to implement certain functionality for an embodiment of the invention. The software may be stored in a medium accessible by a machine or computer-readable medium, such as read-only memory (ROM), random-access memory (RAM), magnetic disk (eg., floppy disk and hard drive), optical disk (eg., CD-ROM) or any other data storage medium. In one embodiment of the invention, the media may store programming instructions in a compressed and/or encrypted format, as well as instructions that may have to be compiled or installed by an installer before being executed by the processor. Alternatively, an embodiment of the invention may be implemented as specific hardware components that contain hard-wired logic for performing the recited functionality, or by any combination of programmed general-purpose computer components and custom hardware components.

In one embodiment of the invention, processing system 200 may comprise a receive interface 202, an address identifier generator 204, a routing module 206 and a transmit interface 208. Receive interface 202 may receive packets of information in need of routing information. Routing information may comprise any standard routing information, such as a port number, channel identifier, device identifier, queue information and so forth. Address identifier generator 204 may process the network address for the packets to generate an address identifier that may be shorter in length than the network address. Routing module 206 may use the address identifier to search for routing information for the packets. Any type of search algorithm may be used to search for the routing information. One embodiment of the invention may use a search algorithm in accordance with the IETF Proposed Standard titled "An Internet Protocol Version Six (IPv6) Aggregatable Global Unicast Address Format," RFC 2374, July 1998 ("RFC 2374"), available from "www.ietf.org." Transmit interface 208 may send the packets to another network node using the routing information. The structure and operation of each module may be discussed in more detail below.

Figure 3:
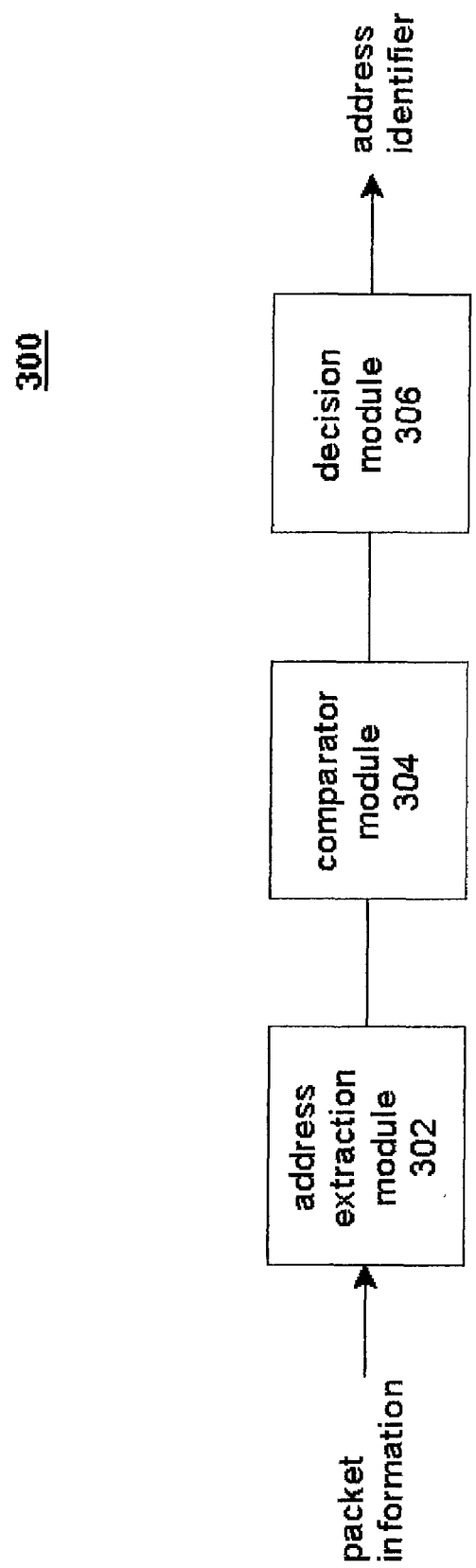
FIG. 3 is a block diagram of an address identifier generator in accordance with one embodiment of the invention.

FIG. 3 is a block diagram of an address identifier generator in accordance with one embodiment of the invention. FIG. 3 illustrates an address identifier generator 300 that may be representative of, for example, address identifier 204. In this embodiment of the invention, address identifier generator 300 may comprise an address extraction module 302, a comparator module 304 and a decision module 306.

Address extraction module 302 may receive packet information from, for example, receive interface 202. In one embodiment of the invention, the packet information may comprise a packet header having control information such as a source address, a destination address, a packet identifier, a packet length and so forth. Address extraction module 302 may extract from the packet information the necessary information to generate an address identifier. In one embodiment of the invention, the extracted information may be a network address, such as the destination address. Address extraction module 302 may then send the extracted information to comparator module 304.

One embodiment may use a network address RFC 2374. RFC 2374 delimits levels in the routing hierarchy using a set of identifiers to aggregate and conserve the initial Ipv6 address space. RFC 2374 specifies three identifiers to divide bit boundaries of an address. The three identifiers include a Top-Level Aggregation Identifier (TLA), a Next-Level Aggregation Identifier (NLA) and a Site-Level Aggregation Identifier (SLA). The initial allocations to an Internet Service Provider (ISP) may be made from a TLA or sub-TLA. Those organizations may then allocate NLAs to their customer ISPs, who in turn may assign SLAs for end-users to create their own local topology. The interface identifier may represent the host portion of an IPv6 address as represented by the right-most 64 bits of the address.

Figure 4:
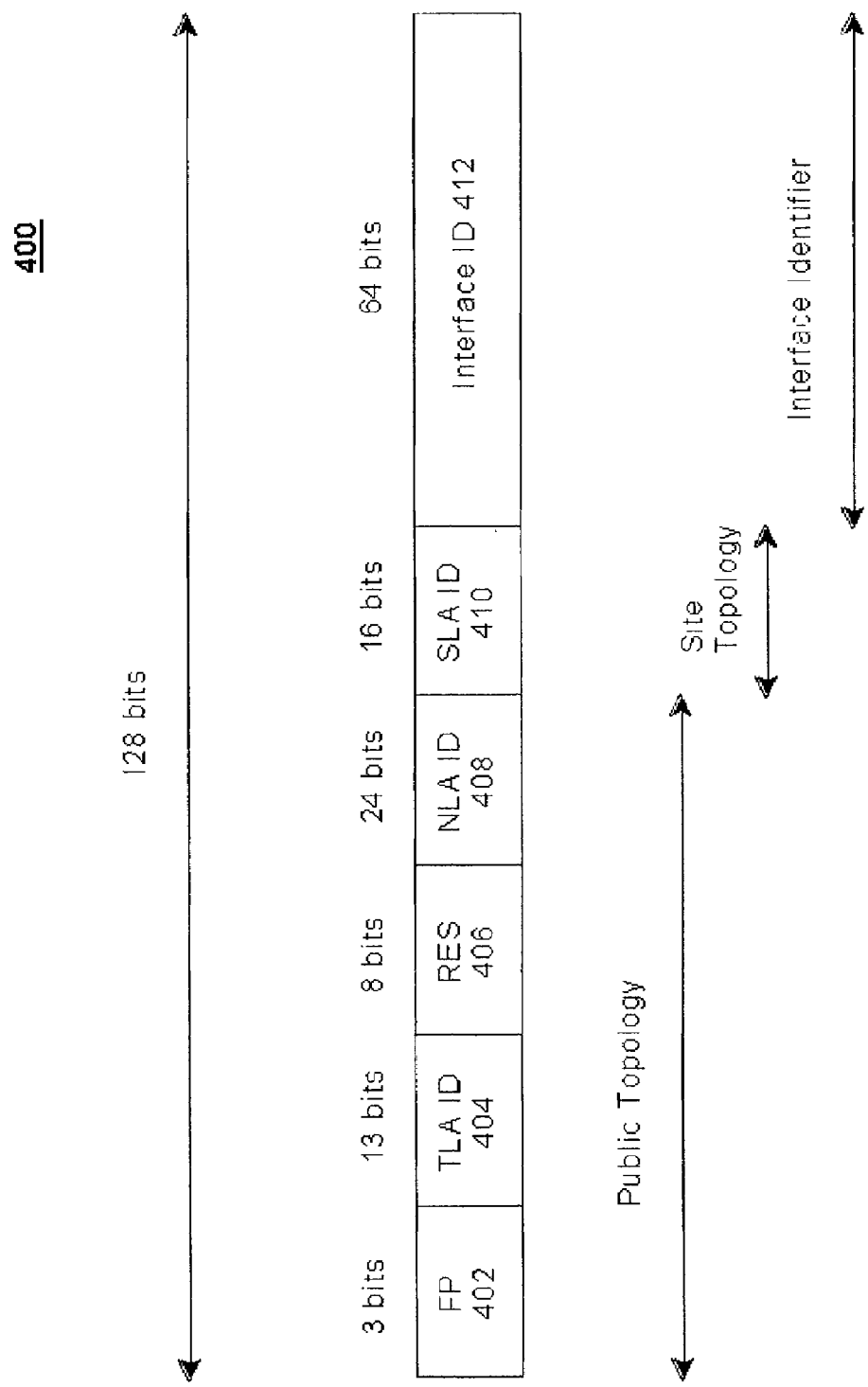
FIG. 4 illustrates an address format suitable for use with one embodiment of the invention.

FIG. 4 illustrates an address format suitable for use with one embodiment of the invention. FIG. 4 illustrates an address format 400 in accordance with RFC 2374. Address format 400 may have a total length of 128 bits. In one embodiment of the invention, address format 400 may comprise a Format Prefix (FP) 402, a TLA 404, a Reserved Field (RES) 406, a NLA 408, a SLA 410 and an Interface Identifier 412. As stated previously, TLA 404 may represent the top level in the routing hierarchy. Default-free routers have a routing table entry for every active TLA, and typically have additional entries providing routing information for the TLA in which they are located. NLA 408 may be used by organizations assigned TLA 404 to create an addressing hierarchy and to identify sites. SLA 410 may be used by an individual organization to create their own local addressing hierarchy and identify subnets. Interface identifier 412 may represent a host or device address, such as a media access control (MAC) layer identifier. The length of interface identifier 412 may comprise, for example, 64 bits.

Figure 5:
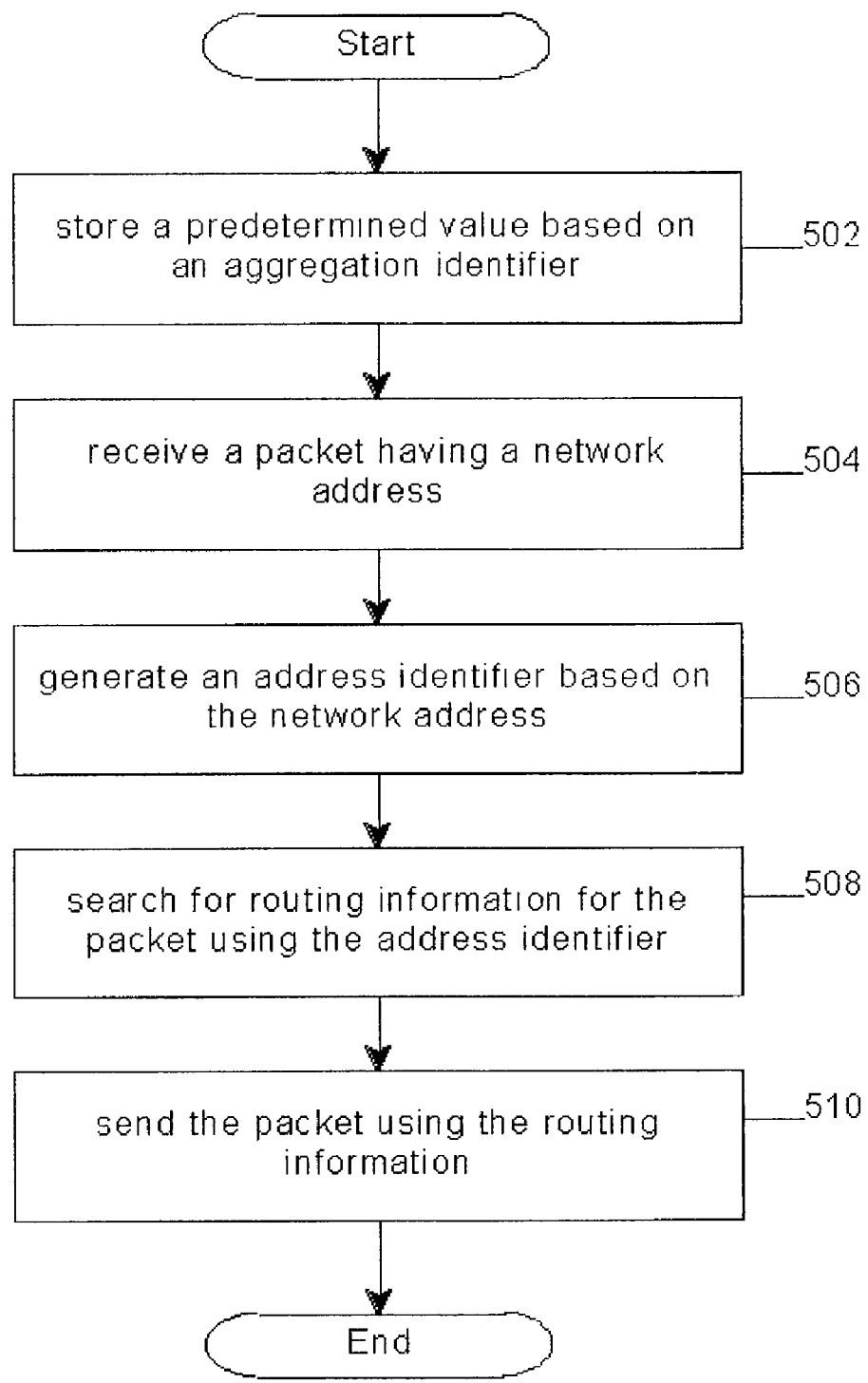
FIG. 5 is a block flow diagram of operations performed by a routing system in accordance with one embodiment of the invention.

The operations of systems 100, 200 and 300, as well as the use of address format 400, may be further described with reference to FIG. 5 and accompanying examples. Although FIG. 5 presented herein may include a particular processing logic, it can be appreciated that the processing logic merely provides an example of how the general functionality described herein can be implemented. Further, each operation within a given processing logic does not necessarily have to be executed in the order presented unless otherwise indicated.

FIG. 5 is a block flow diagram of programming logic performed by a routing system in accordance with one embodiment of the invention. In one embodiment of the invention, the routing system may refer to the software and/or hardware used to implement the functionality for routing information as described herein. In this embodiment of the invention, the routing system may be implemented as part of intermediate node 106. It can be appreciated that this functionality, however, may be implemented by any device, or combination of devices, located anywhere in a communication network and still fall within the scope of the invention.

FIG. 5 may illustrate a programming logic 500 to search for routing information. A predetermined value based on an aggregation identifier may be stored at block 502. A packet having a network address may be received at block 504. An address identifier based on the network address may be generated at block 506. A search for the routing information for the packet may be made using the address identifier at block 508. The packet may be sent using the routing information at block 510.

In one embodiment of the invention, the predetermined value may be a prefix for a network address. The prefix may be, for example, based on an aggregation identifier. An example of an aggregation identifier may be the aggregation identifiers described in RFC 2374, such as a TLA, NLA or SLA. The predetermined value may be configured based on the location of the routing system within a network. For example, if the routing system is implemented at a location assigned a TLA identifier, then the predetermined value may be the prefix associated with the TLA identifier. This may occur at a large ISP, for example. In another example, if the routing system is implemented at a location assigned a TLA identifier and an NLA identifier, then the predetermined value may be the prefix associated with the TLA identifier and the NLA identifier. In yet another example, if the routing system is implemented at a location assigned a TLA identifier, a NLA identifier and a SLA identifier, then the predetermined value may be the prefix associated with all three identifiers.

In one embodiment of the invention, retrieving a first value from the network address may generate an address identifier based on the network address. An example of the first value might be, for example, a combination of the TLA identifier, NLA identifier and SLA identifier. As with the predetermined value, the exact combination for the first value may be based upon the location of the routing system as indicated by an aggregation identifier. The first value may be compared with the predetermined value. If there is a match with the predetermined value, then a second value may be retrieved from the network address. An example of a second value may be the rest of the network address other than the bits retrieved for the first value. The address identifier may be generated using the second value. If there is not a match with the predetermined value, the address identifier may be generated using the entire network address, e.g., the combination of the first value and the second value.

In one embodiment of the invention, the network address may be assigned in accordance with IPv6. In this embodiment, the network address may comprise 128 bits, including an interface identifier of 64 bits. If the second value comprises the interface identifier, then the generated address identifier may be less than the entire network address (i.e., 64 bits versus 128 bits). Accordingly, the amount of time to search for routing information may be decreased as compared to using the entire network address.

Figure 6:
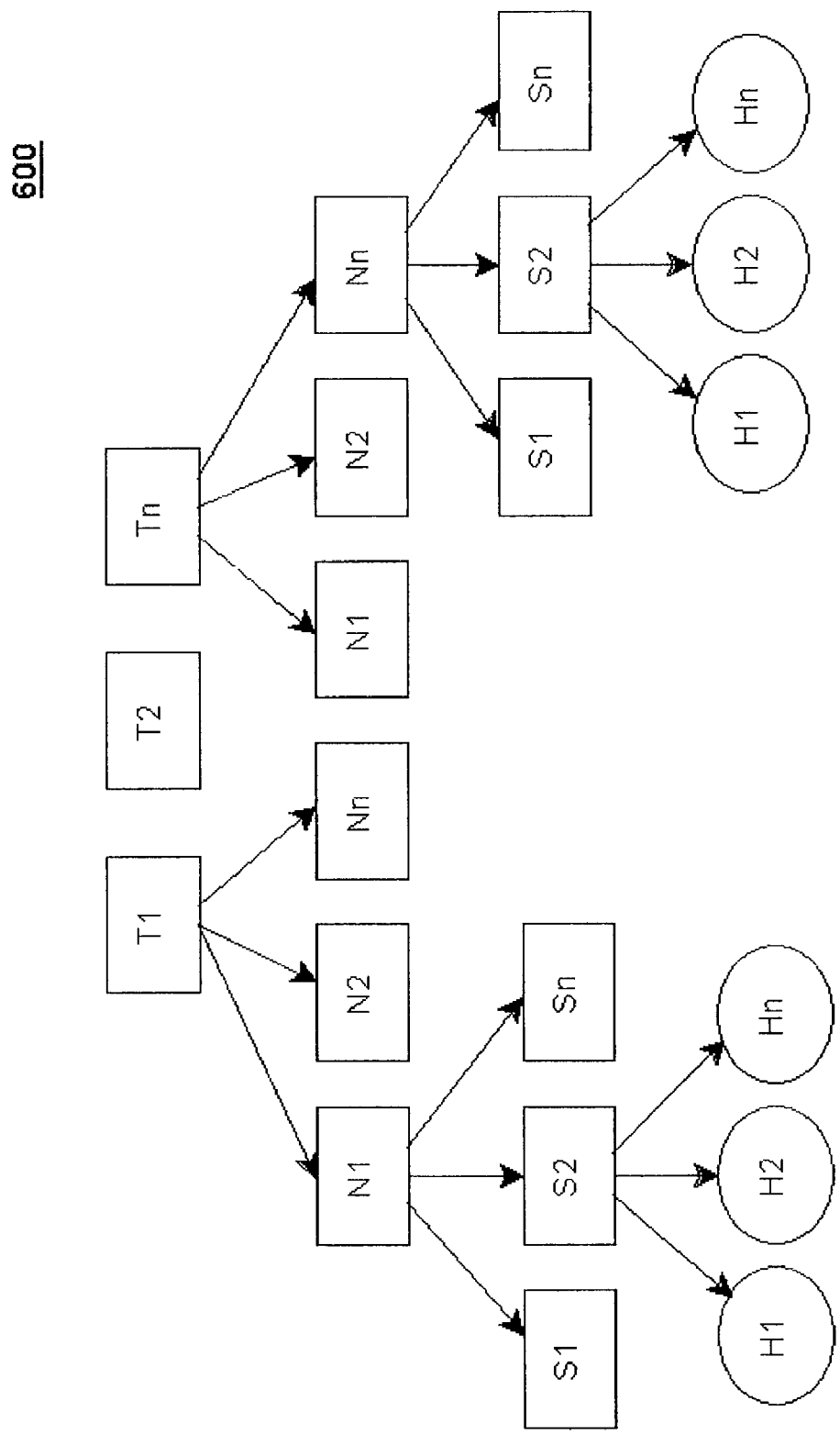
FIG. 6 illustrates a routing hierarchy suitable for use with one embodiment of the invention.

FIG. 6 illustrates a routing structure suitable for use with one embodiment of the invention. FIG. 6 may illustrate a hierarchical routing structure 600 made in accordance with, for example, RFC 2374. Routing structure 600 may comprise TLAs identified as T1, T2 and Tn. Routing structure 600 may also comprise NLAs identified as N1, N2 and Nn. Routing structure 600 may further comprise SLAs identified as S1, S2 and Sn. Finally, routing structure 600 may comprise interface identifiers identified as H1, H2 and Hn. In a hierarchical routing structure, each node may store a unique prefix based on its level of aggregation. For example, S1 may store a unique prefix T1N1S1. All the packets destined to the nodes under S1 should have this constant prefix as part of their network address. The embodiments of the invention may utilize this constant prefix to decrease latency associated with searching for routing information.

FIG. 6 may be used to illustrate this concept. Assume S1 is a site level edge router. In this particular case, the values of the TLA, NLA and SLA (T1N1S1) fields may be extracted from the destination address of a packet and compared to a previously stored value (e.g., predetermined value). If the values match, the packet can be considered incoming and the lower 64 bits (H1) may be used to search for the routing information. Otherwise, all 128 bits (T1N1S1H1) of the address may be used to perform a normal Longest Prefix Matching (LPM) lookup.

It can be appreciated that the embodiments may be applied to any network node at any level within a routing hierarchy. A prefix mask and prefix value may be stored and used to detect incoming packets. If the leading bits of the destination address of a packet match the stored prefix at that level, those bits may be skipped and only the remaining bits in the address may be used to search for the appropriate routing information.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method to search for routing information, comprising:
   receiving a packet having a network address comprising a plurality of aggregation identifiers and an interface identifier;
   retrieving a first value from said network address, said first value associated with one or more of said aggregation identifiers based on a level of aggregation at which said packet is received;
   comparing said first value with a predetermined value comprising a unique prefix based on the level of aggregation;
   retrieving a second value from said network address if said first value matches said predetermined value, said second value comprising at least all of said interface identifier and one or more of said plurality of aggregation identifiers not associated with said first value;
   generating an address identifier based on said network address using only said second value if said first value matches said predetermined value, said address identifier comprising fewer bits than said network address; and searching for routing information for said packet using said address identifier instead of said network address.

2. The method of claim 1, further comprising generating said address identifier using said first value and said second value if said first value fails to match said predetermined value.

3. The method of claim 1, wherein said network address comprises a 128-bit address assigned in accordance with Internet Protocol Version Six.

4. The method of claim 1, wherein said first value comprises a prefix based on an aggregation identifier.

5. The method of claim 4, wherein said aggregation identifier comprises at least one of a top-level aggregation identifier (TLA), next-level aggregation identifier (NLA) and site-level aggregation identifier (SLA).

6. The method of claim 1, wherein said interface identifier comprises a media access control (MAC) layer identifier.

7. The method of claim 1, wherein said interface identifier comprises 64 bits.

8. The method of claim 1, wherein said predetermined value comprises a prefix based on an aggregation identifier.

9. The method of claim 8, wherein said aggregation identifier comprises at least one of a top-level aggregation identifier (TLA), next-level aggregation identifier (NLA) and site-level aggregation identifier (SLA).

10. The method of claim 1, further comprising sending said packet using said routing information.

11. A routing apparatus, comprising:
a receive interface to receive a packet with a network address comprising a plurality of aggregation identifiers and an interface identifier;
an address identifier generator to retrieve a first value from said network address, said first value associated with one or more of said aggregation identifiers based on a level of aggregation at which said packet is received, to compare said first value with a predetermined value comprising a unique prefix based on the level of aggregation, to retrieve a second value from said network address if said first value matches said predetermined value, said second value comprising at least all of said interface identifier and one or more of said plurality of aggregation identifiers not associated with said first value, and to generate an address identifier based on said network address using only said second value if said first value matches said predetermined value, said address identifier comprising fewer bits than said network address; and
a routing module to retrieve routing information using said address identifier instead of said network address.

12. The apparatus of claim 11, further comprising a transmit interface to transmit said packet using said routing information.

13. The apparatus of claim 11, wherein said address identifier generator comprises:
an address extraction module to extract a prefix from said network address;
a comparator module to compare said prefix with a predetermined value; and
a decision module to generate said address identifier using part of said network address if said prefix matches said predetermined value, otherwise generating said address identifier using said entire network address.

14. A system to perform routing in a network, comprising:
a source node to send a packet using a network address comprising a plurality of aggregation identifiers and an interface identifier;
a destination node corresponding to said network address to receive said packet; and
an intermediate node to route said packet between said source node and said destination node, said intermediate node having an address identifier generator to retrieve a first value from said network address, said first value associated with one or more of said aggregation identifiers based on a level of aggregation at which said packet is received, to compare said first value with a predetermined value comprising a unique prefix based on the level of aggregation, to retrieve a second value from said network address if said first value matches said predetermined value, said second value comprising at least all of said interface identifier and one or more of said plurality of aggregation identifiers not associated with said first value, and to generate an address identifier based on said network address using only said second value if said first value matches said predetermined value, said address identifier comprising fewer bits than said network address, said intermediate node further having a routing apparatus to route said packet using said address identifier instead of said network address.

15. An article comprising:
a storage medium;
said storage medium including stored instructions that, when executed by a processor, result in searching for routing information by receiving a packet having a network address comprising a plurality of aggregation identifiers and an interface identifier, retrieving a first value from said network address, said first value associated with one or more of said aggregation identifiers based on a level of aggregation at which said packet is received, comparing said first value with a predetermined value comprising a unique prefix based on the level of aggregation, retrieving a second value from said network address if said first value matches said predetermined value, said second value comprising at least all of said interface identifier and one or more of said plurality of aggregation identifiers not associated with said first value, generating an address identifier based on said network address using only said second value if said first value matches said predetermined value, said address identifier comprising fewer bits than said network address, and searching for routing information for said packet using said address identifier instead of said network address.

16. The article of claim 15, wherein the stored instructions, when executed by a processor, further result in sending said packet using said routing information.

* * * * *

UNITED STATES PATENT AND TRADEMARK OFFICE
CERTIFICATE OF CORRECTION

PATENT NO. : 7,257,643 B2 Page 1 of 1
APPLICATION NO. : 10/150315
DATED : August 14, 2007
INVENTOR(S) : Mathew et al.

It is certified that error appears in the above-identified patent and that said Letters Patent is hereby corrected as shown below:

On the title page item (57), under "Abstract", in column 2, line 2, delete "routine" and insert -- routing --, therefor.

Signed and Sealed this

Fourth Day of December, 2007

JON W. DUDAS
*Director of the United States Patent and Trademark Office*